US010252915B2

(12) United States Patent
Almaadeed et al.

(10) Patent No.: US 10,252,915 B2
(45) Date of Patent: *Apr. 9, 2019

(54) GREEN SYNTHESIS OF GRAPHENE BY USING TOMATO JUICE (71) Applicant: QATAR UNIVERSITY, Doha (QA)

(72) Inventors: Mariam Al Ali Almaadeed, Al-Ghanim (QA); Noorunnisa Khanam Patan, Doha (QA)

(73) Assignee: QATAR UNIVERSITY, Doha (QA)

( * ) Notice: Subject to any disclaimer, the term of this patent is extended or adjusted under 35 U.S.C. 154(b) by 0 days.

This patent is subject to a terminal disclaimer.

(21) Appl. No.: 15/918,994

(22) Filed: Mar. 12, 2018

(65) Prior Publication Data
US 2018/0201510 A1  Jul. 19, 2018

Related U.S. Application Data (63) Continuation of application No. 15/145,603, filed on May 3, 2016, now Pat. No. 9,919,928.

(51) Int. Cl.
*C01B 32/19* (2017.01)
*C01B 32/192* (2017.01)

(52) U.S. Cl.
CPC ............ *C01B 32/19* (2017.08); *C01B 32/192* (2017.08)

(58) Field of Classification Search
CPC ...... C01B 32/184; C01B 32/19; C01B 32/192
See application file for complete search history.

(56) References Cited

U.S. PATENT DOCUMENTS

| 2,798,878 | A | 7/1957 | Hummers |
| 8,771,630 | B2 | 7/2014 | Wu et al. |
| 2013/0156678 | A1 | 6/2013 | Banerjee et al. |
| 2014/0227211 | A1 | 8/2014 | Shankman |
| 2014/0323596 | A1 | 10/2014 | Jeong et al. |
| 2017/0320739 | A1 | 11/2017 | Almaadeed et al. |

FOREIGN PATENT DOCUMENTS

| CN | 101602504 A | 12/2009 |
| CN | 101875491 A | 11/2010 |
| CN | 104261401 A | 1/2015 |
| EP | 2639201 A1 | 9/2013 |

OTHER PUBLICATIONS

"Sonicators", Bioke. <https://www.bioke.com/blobs/Brochures/QS/Catalog.pdf> Accessed Sep. 17, 2018. (2015).*
Akhavan, O., et al; "Increasing the antioxidant activity of green tea polyphenols in the presence of iron for the reduction of graphene oxide", Carbon 50 (Jan. 2012) pp. 3015-3025.

(Continued)

*Primary Examiner* — Richard M Rump
(74) *Attorney, Agent, or Firm* — Squire Patton Boggs (US) LLP (57) ABSTRACT Embodiments of the present invention encompass methods of forming graphene from graphene oxide and/or graphite oxide using tomato juice.

37 Claims, 4 Drawing Sheets (56) References Cited

OTHER PUBLICATIONS

Kovtyukhova, N.I., et al; "Layer-by-layer assembly of ultrathin composite films from micron-sized graphite oxide sheets and polycations" *Chemistry of Materials, ACS publications* 11 (Jan. 1999) pp. 771-778.
Kuila, Tapas, et al; "A green approach for the reduction of graphene oxide by wild carrot root", *Carbon* 50 (Sep. 2011) pp. 914-921.
Thakur, Suman, et al; "Green reduction of graphene oxide by aqueous phytoextracts", *Carbon* 50 (Jul. 2012) pp. 5331-5339.
Wang, Yan, et al; "Facile synthesis of soluble graphene via a green reduction of graphene oxide in tea solution and its biocomposites", *Applied Materials & Interfaces, ACS publications* (Mar. 2011) pp. 1127-1133.
Zheng, Longzhen, et al; "Preparation of cobalt-tetraphenylpolphyrin/ reduced graphene oxide nano composite and its application on hydrogen peroxide biosensor" *Analytical Chemica Acta*, 768 (Jan. 2013), pp. 69-75.
Zhu, Xu, et al; "Reduction of graphene oxide via ascorbic acid and its application for simultaneous detection of dopamine and ascorbic acid", *International Journal of Electrochemical Science*, vol. 7 (Jun. 2012) pp. 5172-5184.

\* cited by examiner

Figure 1. XRD pattern of graphite

Figure 2. XRD pattern of graphene oxide

Figure 3. XRD pattern of graphene

Figure 4. Raman Spectra of graphite

Figure 5. Raman Spectra of graphene oxide

Figure 6. Raman Spectra of graphene

GREEN SYNTHESIS OF GRAPHENE BY USING TOMATO JUICE

CROSS-REFERENCE TO RELATED APPLICATION

This application is a continuation of U.S. application Ser. No. 15/145,603, filed on May 3, 2016, and published as US 2017-0320739 A1 on Nov. 9, 2017, which is hereby incorporated by reference herein, in its entirety and expressly including any drawings.

FIELD

This invention relates to materials science, and more specifically, methods of manufacturing graphene from graphene oxide.

BACKGROUND

Allotropes, which are different physical forms of the same element, of carbon include diamond, graphite, and charcoal. Graphite is a layered structure of stacked two-dimensional planes of a honeycomb or hexagonal lattice formed by $sp^2$ hybridized carbon atoms. In 2004, these individual planar layers of carbon atoms, graphene, were isolated. In addition to forming graphite, graphene forms the basis of fullerenes, and carbon nanotubes. Graphene exhibits unique mechanical, thermal, and electrical properties.

Methods exist to form graphene from graphene oxide. Some chemical methods involve toxic chemicals, and some intermediates produced by these chemical methods may be explosive. Thermal methods exist, but require a large use of energy, which is expensive.

Thus, additional methods of production of graphene from graphene oxide are needed.

INCORPORATION BY REFERENCE

All publications, patents, and patent applications mentioned in this specification are herein incorporated by reference to the same extent as if each individual publication, patent, or patent application was specifically and individually indicated to be incorporated by reference, and as if each said individual publication, patent, or patent application was fully set forth, including any figures, herein. To the Extent that any definition provided herein conflicts with a definition provided in any of the incorporated by reference materials, the definition provided herein controls.

SUMMARY

Embodiments of the present invention encompass methods of forming graphene from graphene oxide. The methods include forming a suspension comprising graphene oxide, graphite oxide, or both, and a solvent, or in other words, forming a suspension comprising the product of oxidation of graphite and a solvent. Fresh tomato juice is added to the suspension. The graphite, graphite oxide, or both are exfoliated. After exfoliation, such as by sonication of the suspension before, after, during, or a combination thereof the addition of the tomato juice, the suspension sits quiescently for a time period to form graphene. After the suspension has reacted, the solids are separated from the suspension. The initial graphite oxide, graphene oxide, or both may be the product of an oxidation reaction on graphite.

DETAILED DESCRIPTION

The term "as used herein" applies to the entire disclosure and expressly includes the specification, claims, and drawings.

As used herein, the use of the singular includes the plural and vice versa unless expressly stated to be otherwise. That is, "a," "an" and "the" refer to one or more of whatever the word modifies. For example, "an article" may refer to one articles, two articles, etc. By the same token, words such as, without limitation, "articles" would refer to one article as well as to a plurality of articles unless it is expressly stated or obvious from the context that such is not intended.

As used herein, words of approximation such as, without limitation, "about," "substantially," "essentially," and "approximately" mean that the word or phrase modified by the term need not be exactly that which is written but may vary from that written description to some extent. The extent to which the description may vary from the literal meaning of what is written, that is the absolute or perfect form, will depend on how great a change can be instituted and have one of ordinary skill in the art recognize the modified version as still having the properties, characteristics and capabilities of the modified word or phrase. With the preceding discussion in mind, a numerical value herein that is modified by a word of approximation may vary from the stated value by ±15% in some embodiments, by ±10% in some embodiments, by ±5% in some embodiments, or in some embodiments, may be within the 95% confidence interval.

As used herein, any ranges presented are inclusive of the end-points. For example, "a temperature between 10° C. and 30° C." or "a temperature from 10° C. to 30° C." includes 10° C. and 30° C., as well as any temperature in between. In addition, throughout this disclosure, various aspects of this invention may be presented in a range format. The description in range format is merely for convenience and brevity and should not be construed as an inflexible limitation on the scope of the invention. Accordingly, the description of a range should be considered to have specifically disclosed all the possible subranges as well as individual numerical values within that range. As an example, a description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. Unless expressly indicated, or from the context clearly limited to integers, a description of a range such as from 1 to 6 should be considered to have specifically disclosed subranges 1.5 to 5.5, etc., and individual values such as 3.25, etc. that is non-integer individual values and ranges beginning with, ending with or both beginning with and ending with a non-integer value(s). This applies regardless of the breadth of the range.

As used herein, a range may be expressed as from "about" one particular value and/or to "about" another particular value, for example from about 5 to about 10. When such a range is expressed, another embodiment is included, the embodiment being from one particular value and/or to the other particular value. Similarly when values are expressed as approximations by use of the antecedent "about," it will be understood that the particular value forms another embodiment. As an example, the disclosure of the range "about 5 to about 10" also discloses the "5 to 10." Similarly, the disclosure of "a temperature of about 100° C." is equivalent to disclosing "a temperature of 100° C."

As used herein, "solvent" is defined as a substance capable of dissolving one or more other substances, capable of at least partially dissolving the other substance(s), or at least dispersing one or more other substances to form a uniformly dispersed solution at a selected temperature and pressure. A solvent can refer to one chemical compound, or a mixture of chemical compounds. A solvent can be a fluid.

As used herein, the phrase "wt %" means a percent (%) by weight.

Graphene has a wide range of industrial applications including, without limitation, use in forming composites with different types of polymers, and use in sensors, nanoelectronics, super capacitors, and batteries. Embodiments of the present invention encompass methods of forming graphene from graphene oxide using tomato juice, which is a natural material. Embodiments of the present invention include methods of forming graphene from graphene oxide (or the product of an oxidation reaction on graphite) that are simple, low cost, safe, and environmental friendly.

As used herein, the terms "graphene" and "graphene oxide" encompass both single- and multi-layer graphene and graphene oxide, respectively. As described above, a single layer of carbon atoms or a sheet in the layered stack of sheets that form graphite is graphene. As used herein, graphene will encompass a single plane or layer of $sp^2$-hybridized carbon atoms, as well as stacks of more than one layer on top of each other, but not more than 10 layers stacked together. The same definitions also apply to single- and multi-layer graphene oxide. Graphene and graphene oxide, like most crystals, may contain impurities and/or defects such as and without limitation, gaps in the carbon lattice, substitution of a non-carbon atom for a carbon atom, or both.

Embodiments of the present invention encompass methods in which graphene oxide is reduced with tomato juice. Graphene oxide may be obtained by oxidizing graphite to graphite oxide and exfoliating the graphite oxide, and/or partially or completely exfoliating the graphite during the oxidation process. The exfoliation may occur before, during, or after the oxidation, and in some cases, before, or during the reduction of the graphene oxide, graphite oxide, or combination thereof, to graphene. The purity of the starting graphite, graphite oxide, or graphene oxide will depend upon the ultimate use of the graphene as the properties of the graphene are impacted by defects.

One method of producing graphitic oxide is described in U.S. Pat. No. 2,798,878, issued on Jul. 9, 1957, to W. S. Hummers, Jr. Modified Hummers methods are described in N. I. Kovtyukhova, P. J. Ollivier, B. R. Martin, T. E. Mallouk, S. A. Chizhik, E. V. Buzaneva, and A. D. Gorchinskiy. "Layer-by-Layer Assembly of Ultrathin Composite Films from Micron-Sized Graphite Oxide Sheets and Polycations," *Chemistry of Materials*, ACS publications 11 (1999) 771-778, and Longzhen Zheng, Dan Ye, Leyan Xiong, Jingpeng Xu, Kun Tao, Zhijun Zou, Danlin Huang, Xiaowei Kang, Shaoming Yang, and Jian Xia. "Preparation of cobalt-tetraphenylpolphyrin/reduced graphene oxide nano composite and its application on hydrogen peroxide biosensor," *Analytical Chemical Acta*, 768 (2013): 69-75." Graphite oxide may also be produced by thermal methods. In some cases, the product of oxidation of graphite includes graphene oxide. In some embodiments, the product of the oxidation of graphite is a combination of graphite oxide and graphene oxide and possible unreacted graphite. In some embodiments, dispersing agents are added to the solution in which the oxidation of graphite occurs.

The graphene oxide, graphite oxide, or combination thereof is suspended in a solvent. In some embodiments, the phrase "graphene oxide, graphite oxide, or a combination thereof" also encompasses the product of the oxidation of graphite which may include unreacted graphite and potentially graphene in addition to graphene oxide and graphite oxide. Water is the preferred solvent. In some embodiments the water is deionized, and in some embodiments the water is distilled. In some embodiments, the water is used "as received," without the addition of other substances (also known as "free of additives"), and without filtering or other processing of the water. In some embodiments, the pH of the water is adjusted. In some embodiments the solvent may be up to 50 wt % of a second solvent in combination with distilled water. In some embodiments, the solvent is non-aqueous. In some embodiments, the second solvent is an alcohol such as without limitation methanol, ethanol, propanol, or a combination thereof. In some embodiments, there is 0.01 wt % to 25 wt % graphene oxide, graphite oxide, or combination thereof dispersed in the solvent, preferably 0.1 wt % to 15 wt % graphene oxide, graphite oxide, or combination thereof dispersed in the solvent, and more preferably, 0.2 wt % to 5 wt % graphene oxide, graphite oxide, or combination thereof dispersed in the solvent. In some embodiments, there is 0.1 wt % to 3 wt % graphene oxide, graphite oxide, or combination thereof dispersed in the solvent. In some embodiments, the solvent and the graphene oxide, graphite oxide, or combination thereof comprises at least 95 wt %, at least 97 wt %, at least 98 wt %, at least 98.5 wt %, at least 99 wt %, or at least 99.5 wt % of the suspension. In an embodiment, 99 wt % of the suspension consists of water and the product of oxidation of graphite. In an embodiment, 99 wt % of the suspension consists of water, and graphite oxide, graphene oxide, or a combination thereof. In some embodiments, the suspension includes only the solvent and the graphene oxide, the graphitic oxide, or combination thereof.

After the suspension is made, the reducing agent, in this case, fresh tomato juice is added. The tomato is the fruit of the plant *Solanum lycopersicum*. In preferred embodiments, the tomato is ripe. The juice may be produced by any known method such as without limitation, a hand blender, a food processor, or any available juicer for home or commercial use. In some embodiments, the juice is filtered or strained to remove solids. The filter or strainer may have approximately square openings of 80 micrometers to 3.175 mm on each side. In some embodiments, the juice is used without the addition of any additives such as sugar. In some embodiments, the juice is not diluted with additional water, and not diluted with any other solvent. In preferred embodiments, the tomato juice used is undiluted and has no additives.

The tomato juice used is fresh. In some embodiments, fresh is defined as used within 1 hour of being produced (squeezed from the fruit). In some embodiments, fresh is defined as used within 45 minutes of being produced, within 30 minutes of being produced, within 15 minutes of being produced, and within 5 minutes of being produced.

In some embodiments, the weight:weight ratio (or mass:mass ratio) of the fresh tomato juice to the sum of the weight of the graphene oxide and graphite oxide ranges from 10:1 to 1:10, preferably 5:1 to 1:5, and even more preferably 3:1 to 1:3. In some embodiments, the weight (or mass) of the fresh tomato juice to the sum of the weight (or mass) of the sum of the graphene oxide and graphite oxide ranges from 1:2 to 2:1. In some embodiments, the weight (or mass) of the fresh tomato juice to the weight (or mass) of the product of oxidation of graphite ranges from 1:2 to 2:1.

In some embodiments, 1 ml of tomato juice is added per each 1-10 milliliters of a dispersion the dispersion being 0.1 wt % to 3 wt % graphene oxide, graphite oxide, or combination thereof dispersed in a solvent. In some embodiments, 1 ml of tomato juice is added per each 2-8 milliliters of a dispersion, the dispersion being 0.1 wt % to 3 wt % graphene oxide, graphite oxide, or combination thereof dispersed in a solvent.

As a non-limiting example, 5 milliliters of tomato juice may be added to 20 milliliters of an aqueous dispersion of 0.5 wt % graphene oxide, graphite oxide, or combination thereof.

The graphite oxide/graphene oxide is exfoliated. In other words, the stacked sheets of graphite/graphite oxide are separated. Means of exfoliation include, without limitation, mechanical means, thermal means (such as, without limitation, use of a temperature of 1100° C.), use of supercritical carbon dioxide, addition of water, acid, or base, a pH change, centrifugation, and sonication. The methods may be used individually or in combination, and the use in combination may be concurrently, separately, or both. Multiple applications may be used, as for example addition of water, acid, or base, followed by centrifugation on more than one occasion. The exfoliation may occur before, during, or after oxidation of graphite, before, during, and/or after reduction of graphite oxide, graphene oxide, or a combination thereof to graphene. In some embodiments, the Hummers method of oxidizing graphite produces a combination of graphene oxide and graphite oxide.

In the embodiments of the present invention, sonication is the preferred method of exfoliation. In some embodiments, the sonication is executed at less than 20 kHz, and in some embodiments, the sonication is executed at about 20 kHz. In preferred embodiments, ultrasonication (greater than 20 kHz) is used. Sonication may occur for a time period ranging from 5 minutes to 6 hours, preferably 15 minutes to 3 hours, more preferably 20 minutes to 2 hours, and most preferably 30 minutes to 1 hour. In some embodiments, the sonication is executed for 45±5 minutes.

As noted above, the exfoliation may occur before, during, and/or after oxidation of graphite, and/or before, during, or after reduction of graphite oxide, graphene oxide, or a combination thereof, to graphene. In some embodiments, the conditions of oxidation of graphite to graphite oxide also at least partially exfoliates the graphite/graphite oxide such that a mixture of graphite oxide and graphene oxide exists, potentially also including un-oxidized or only partially oxidized graphite. In some embodiments, the suspension of graphene oxide, graphite oxide, or combination thereof is sonicated for some time period before the addition of the reducing agent, which is tomato juice in the embodiments of the present invention. In some embodiments, the tomato juice is added to the suspension of graphene oxide, graphite oxide, or combination thereof before any sonication. In some embodiments, it is a combination of the above, that is the suspension is sonicated both before and after addition of the tomato juice. In some embodiments, the suspension may be sonicated during the addition of the tomato juice. In some embodiments, the suspension is sonicated during the addition of the tomato juice in addition to sonication before and/or after the addition of the tomato juice. In preferred embodiments, the suspension is subjected to ultrasonication at least after the tomato juice has been added to the suspension of the graphene oxide, graphite oxide, or combination thereof.

The sonicated suspension is then allowed to react for a time period. In embodiments of the present invention, the sonicated suspension is allowed to sit quiescently in an environment at a temperature of in the range of about 18-25° C. In some embodiments, the sonicated suspension is allowed to sit quiescently in an environment at a temperature of in the range of about 20-22° C. In some embodiments, the temperature of the environment in which the sonicated suspension sits is tightly controlled (±2° C., ±1.5° C., or ±1° C.). In some embodiments, the temperature of the environment in which the sonicated suspension sits is not tightly controlled (±5° C., with excursions up to 30° C., and/or as low as 15° C., where excursion is a duration of 5 minutes or fewer). In some embodiments, for the environment in which the sonicated suspension sits there is no control of pressure, and no vacuum is applied. In some embodiments, the environment in which the sonicated suspension sits is at standard atmospheric pressure, or about 101.325 kPa (±10.1325 kPa) where kPa is kilopascal, or 29.92 inches (inHg) (±2.99 inHg) or 760 millimeters of mercury (mmHg) (±76 mmHg). In some embodiments, the humidity of the environment in which the sonicated suspension sits ranges from 3% rh to 95% rh (rh=relative humidity). In some embodiments, the environment in which the sonicated suspension sits is exposed to air without any addition or removal of specific gas. In other embodiments, the environment in which the sonicated suspension sits has a low oxygen level (such as note more than 5 volume %, preferably, not more than 2 volume %, and most preferably, not more than 1 volume %).

The sonicated suspension with added tomato juice sits quiescently for a time period. Thus, "sits quiescently" means that there is no stirring or agitation of the suspension by any means. The sonicated suspension is not shaken, rotated, or centrifuged. The sonicated suspension sits without external agitation.

The time period during which the sonicated suspension with added tomato juice sits quiescently ranges from about 12 hours to about 72 hours. In some embodiments, the time period during which the sonicated suspension with added tomato juice sits quiescently is not less than 18 hours, and not more than 48 hours, preferably, not less than 20 hours, and not more than 36 hours, and more preferably, not less than 22 hours, and not more than 30 hours. In some embodiments, the time period during which the sonicated suspension with added tomato juice sits quiescently is 24±1.5 hours. After the sonicated suspension with added tomato juice sits quiescently for the time period, the solids are separated from the solvent, and then allowed to dry by being placed in an environment at a temperature range of about 18-25° C. In some embodiments, the solids are separated by using a vacuum filter, and/or a Bückner funnel with a sintered glass disc of 4 to 5.5 micro meters. In some embodiments, the solids are removed by centrifuging before filtering.

As used herein, with respect to the solids recovered from the suspension after the reduction process (the solids recovered from the sonicated suspension after the time period of sitting quiescently), "dry" is a solvent content of not more than 5 wt %, and in some embodiments, not more than 2 wt %. In some embodiments, "dry" is a solvent content of not more than 1 wt %, and in some embodiments, not more than 0.5 wt %. In preferred embodiments, the solvent is water. In some embodiments, the solids are allowed to dry in an environment at a temperature of in the range of about 20-22° C. In some embodiments, the temperature of the environment in which the solids are allowed to dry is tightly controlled (±2° C., ±1.5° C., or ±1° C.). In some embodiments, the temperature of the environment in which the solids are allowed to dry is not tightly controlled (±5° C., with excursions of up to 30° C., and/or as low as 15° C., where excursion is a duration of 5 minutes or fewer). In some embodiments, the environment in which the solids are allowed to dry is at standard atmospheric pressure, or about 101.325 kPa (±10.1325 kPa) or 29.92 inches (inHg) (±2.99 inHg) or 760 millimeters of mercury (mmHg) (±76 mmHg). In some embodiments, the environment in which the solids are allowed to dry is under a vacuum (at least 20% lower than standard atmospheric pressure at the specific elevation). In some embodiments, the humidity of the environment in which the solids are allowed to dry ranges from 0.1% rh to 95% rh, preferably from 0.1% rh to 50% rh, where rh is the relative humidity. In some embodiments, air or another fluid is blown over the solids to increase the rate of drying. The product, the graphene solid, has an average diameter of about 50 nm to about 100 nm, such as and without limitation, around 74.7 nm, which may be determined from direct measurement of a transmission electron microscope (TEM) image. In some embodiments, the average diameter is from about 50 nm to about 100 nm as measured using laser-light scattering or photon correlation spectroscopy.

EXAMPLES

The examples presented in this section are provided by way of illustration of the current invention only and are not intended nor are they to be construed as limiting the scope of this invention in any manner whatsoever.

The following abbreviations may be used in the Examples:

g=grams;
ml=milliliters ($10^{-3}$ liter);
min=minutes;
hr=hour;
hrs=hours;
M=molarity;
kV=kiloVolts;
mA=milliAmpheres;
cm=centimeter, $10^{-2}$ meter;
Å=Ångström, $10^{-10}$ meter; and
micron=micrometer, $10^{-6}$ meter.

Example 1

1A. Preparation of Graphene Oxide (GO)

Graphene oxide, graphite oxide, or a combination thereof (GO) was prepared from natural graphite flakes with size of 50 microns by a modified Hummer's method (see Kovtyukhova et al.; Zheng et al.). Briefly, graphite (3.0 g) was added to concentrated (18.4 M) $H_2SO_4$ (70 mL) under stirring at room temperature (approximately 20-25° C.). Then $NaNO_3$ (1.5 g) was added and the mixture was cooled to 0° C. Under vigorous agitation, $MnO_4$ (9.0 g) was added slowly to keep the temperature of the suspension lower than 20° C. and the temperature was measured during the process with a thermometer. The mixture was stirred at 35° C. for 2 hours. Then distilled water (150 mL) was added and the solution was stirred 90° C. for 15 min. An additional 500 ml of distilled water was added and followed by a slow addition of 15 mL of $H_2O_2$ (3 volume % aqueous solution), turning the color of the solution from dark brown to yellow. The mixture was filtered by vacuum on a large Büchner funnel which contained a sintered glass disc, and washed with 1:10 HCl (hydrochloric acid) to water aqueous solution (250 mL) to remove metal ions followed by washing with 200 mL of distilled water to remove the acid. The resulting solid was allowed to dry (to a lower water content, approximately 5 wt % or lower than 5 wt %) in air in an environment at a temperature of about 20° C. to about 25° C., and subsequently diluted to make a graphene oxide (GO) aqueous dispersion (0.5 wt %). The resulting product GO has a purity of 73.15% of carbon and oxygen of 26.31%.

1B. Reduction of Graphene Oxide by Using Fresh Tomato Juice

Fresh juice was prepared from the fruit (tomato) by using a hand blender. No sugar or any other substances were added to the tomato juice. Fresh tomato juice (free of additives, and un-diluted), about 5 ml, was added to the GO suspension, about 20 ml of about 0.5 wt % aqueous dispersion, and this suspension was ultrasonicated for 45 minutes. The mixture was kept in an environment at room temperature (approximately 20-25° C.) for 1 day (24 hours±3 hours). After 1 day the suspension colour was changed from brown to black which confirms that graphene oxide was reduced by the juice. The solids in the resulting suspension were filtered out, and subsequently washed and dried at room temperature (approximately 20-25° C.). X-ray Photoelectron Spectroscopy (XPS) analysis revealed that the graphene produced in the above process contained 98% carbon and 1.32% oxygen.

In summary, the above process is:

Example 2

Characterization of Graphite, Graphene Oxide and Graphene.

2.1. XRD Results

Figure 1:
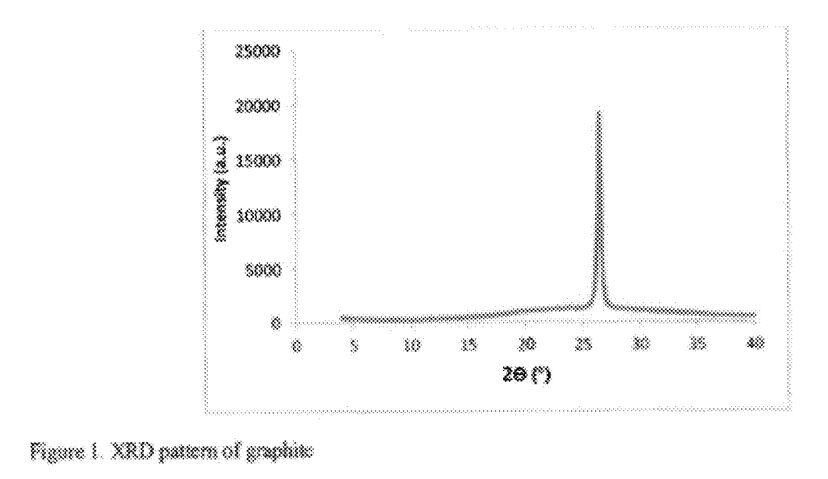
FIG. 1 depicts the X-ray diffraction (XRD) pattern of graphite.
Figure 2:
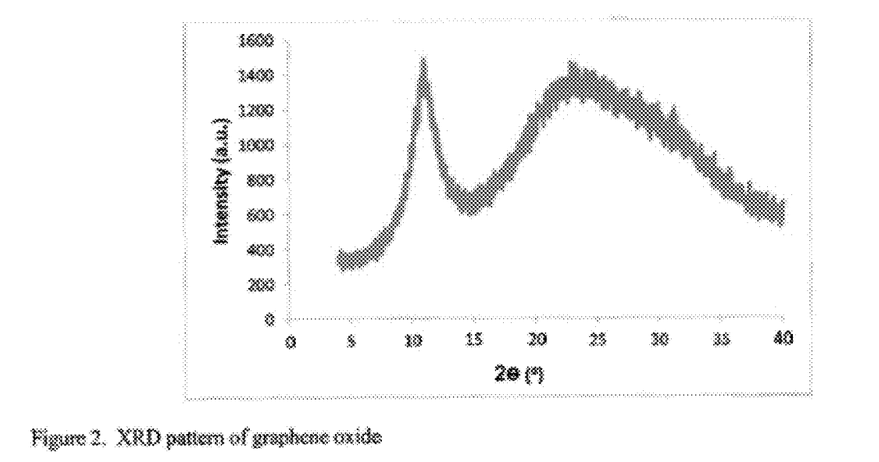
FIG. 2 depicts the X-ray diffraction (XRD) pattern of graphene oxide.
Figure 3:
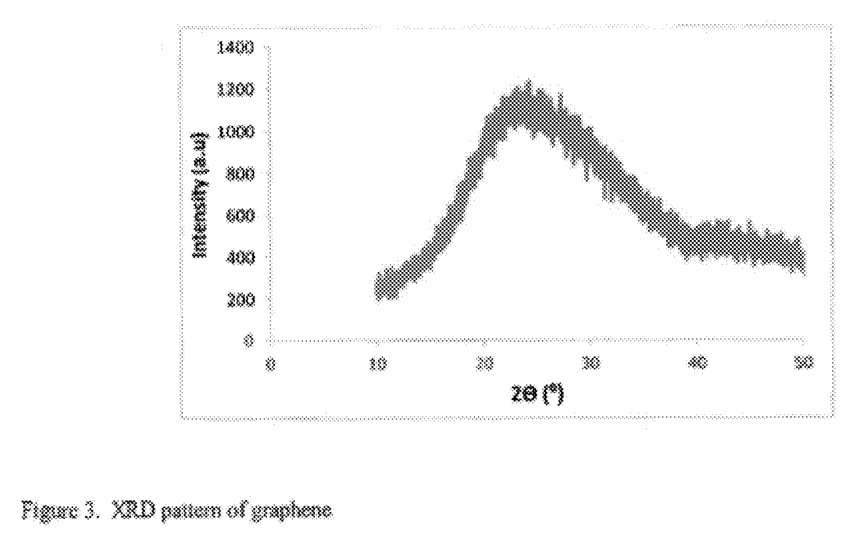
FIG. 3 depicts the X-ray diffraction (XRD) pattern of a graphene oxide sample produced by an embodiment of the present invention.

The X-ray Diffraction (XRD) patterns of graphite, graphene oxide and graphene were analyzed by using powder X-Ray diffractometer, specifically Rigaku Miniflex™ 2 Desktop. The XRD patterns were recorded with Cu radiation at 30 KV, 15 mA in the range of 2θ=5° to 70°. A continuous scan was used and 2°/min was used as scan speed. The results are shown in FIGS. 1 and 2, for graphite and graphene oxide, respectively. FIG. 3 shows the XRD pattern of graphene, which was prepared by using fresh tomato juice (using a method such as that described in Example 1).

The XRD pattern of graphite in (FIG. 1) shows a strong sharp diffraction peak at 2θ of 26.56° which corresponds to an interlayer spacing of 3.35 Å. The XRD spectra of Graphene oxide (FIG. 2) shows a peak at 2θ of 10.82°, which corresponds to an interlayer spacing of 8.17 Å. The larger interlayer spacing of 8.17 Å is indirect evidence of the oxidation because it is significantly larger than that of the graphite. The increase in spacing is due to the formation of oxygen contacting functional groups between the graphite layers. In FIG. 2, another peak appeared at 2θ of 25.92° which corresponds to an interlayer spacing of 3.434 Å.

Figure 4:
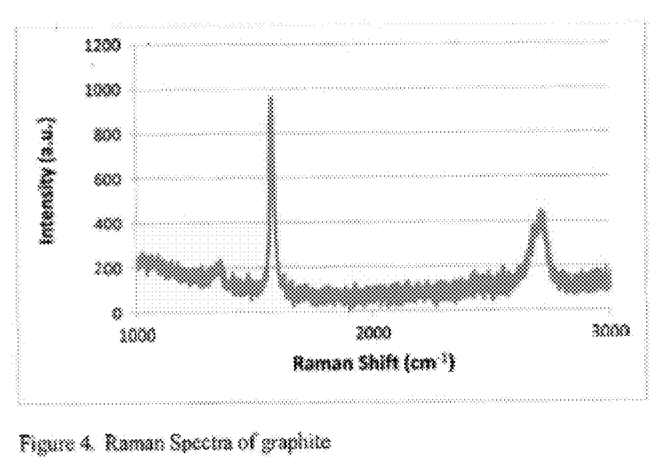
FIG. 4 depicts the Raman spectra of graphite.
Figure 5:
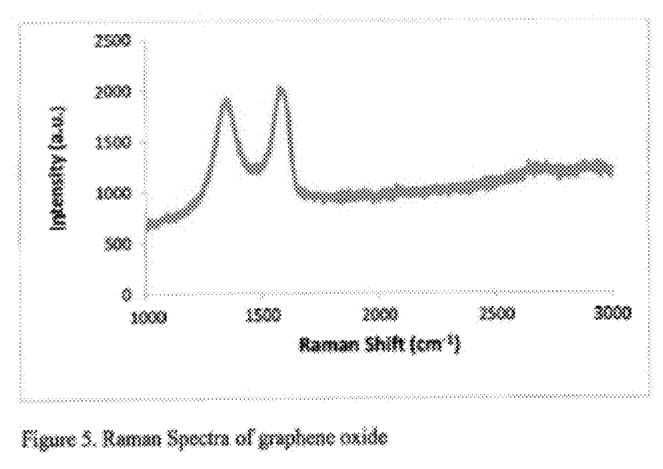
FIG. 5 depicts the Raman spectra of graphene oxide.
Figure 6:
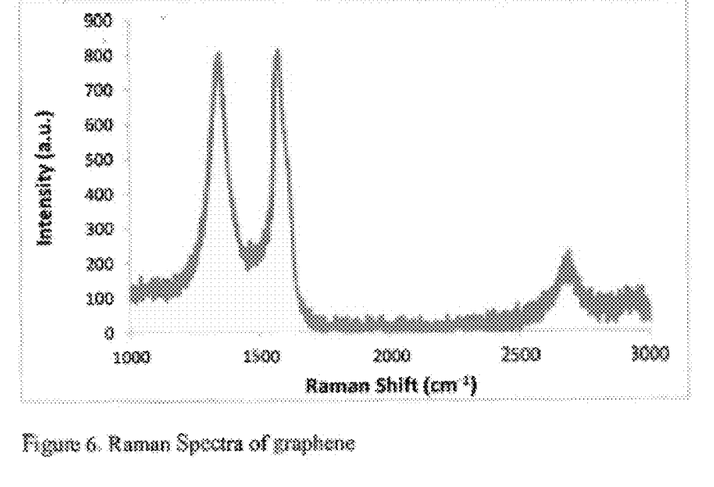
FIG. 6 depicts the Raman spectra of a graphene oxide sample produced by an embodiment of the present invention.

After reduction of GO with the fresh tomato juice, the peak of 2θ at 10.82° disappears and a broad peak appears, starting from 2θ at 22-24°, as exhibited in FIG. 3. This disappearance of the peak is evidence of the reduction of GO to the graphene. The presence of the broad peak at 22-24° in graphene indicates the presence of few layers of graphene. This peak corresponds to 002 plane of graphite with interlayer spacing of 3.65 Å which is due to the removal of oxygen atoms that got into the graphite gallery during the intercalation process. These XRD results, shown in FIG. 3, confirm the reduction process of GO to graphene by using the tomato juice 2.2 Raman Spectroscopy Results Raman Spectroscopy has become a powerful method to characterize the graphene and graphene based materials. Raman spectra of graphite and graphene oxide are shown in FIGS. 4 and 5. Significant structural changes happen during the processing from pristine graphite to graphite oxide, graphene oxide, or a combination thereof. The Raman spectrum of the pristine graphite (with 50 micron in size), as expected, displays a prominent G peak as the only feature at 1577 $cm^{-1}$, corresponding to the first-order scattering of the E2g mode. In the Raman spectrum of graphene oxide, the G band is broadened and shifted to 1604 $cm^{-1}$. In addition, the D band at 1364 $cm^{-1}$ becomes prominent, indicating the reduction in the size of the in-plane $sp^2$ domains, possibly due to the extensive oxidation. FIG. 6 shows the Raman spectra of a graphene sample produced with an embodiment of the present invention by using the tomato juice. The Raman spectrum of the graphene has both G and D bands as seen in FIG. 6, at approximately at 1578 $cm^{-1}$ and 1348.3 $cm^{-1}$, respectively. In addition, as shown in FIG. 6, a new band at 2700 $cm^{-1}$ is seen in FIG. 6, and this new band is referred to as the 2D band and it is seen only in the graphene structures. The ratio of $I_{2D}/I_G$ of the intensity depends on the number of graphene layers. The intensity ratio $I_{2D}/I_G<1$ in graphene prepared by using an embodiment of the present invention using the tomato juice indicates multiple layers of graphene.

Accordingly, it is understood that the above description of the present invention is susceptible to considerable modifications, changes and adaptations by those skilled in the art, and that such modifications, changes and adaptations are intended to be considered within the scope of the present invention, which is set forth by the appended claims.

What is claimed is:

1. A method comprising:
    forming a suspension comprising a solvent and a product of oxidation of graphite, the product of oxidation of graphite comprising graphene oxide, graphite oxide, or a combination thereof;
        wherein the graphene oxide, the graphite oxide, or the combination thereof comprise about 0.01 wt % to about 25 wt % of the suspension;
    adding fresh tomato juice to the suspension;
    exfoliating the product of oxidation of graphite, exfoliating graphite during formation of the product of oxidation of graphite, or a combination thereof;
    after exfoliation, allowing the suspension with added fresh tomato juice to sit quiescently for a time period at a temperature in the range of about 18° C. to about 25° C. to form a solid product, the solid product comprising the exfoliated graphene oxide, the exfoliated graphite oxide, or both, that have been at least partially reduced to graphene;
    after the time period, separating the solid product comprising graphene from the suspension with added fresh tomato juice.

2. The method of claim 1, wherein the exfoliation comprises ultrasonication.

3. The method of claim 2, wherein the suspension with added fresh tomato juice is subjected to ultrasonication.

4. The method of claim 2, wherein ultrasonication is executed for at least 45 minutes.

5. The method of claim 1, wherein the solvent comprises water.

6. The method of claim 5, wherein 99 wt % of the suspension consists of water and the product of oxidation of graphite.

7. The method of claim 1, wherein the fresh tomato juice is added to the suspension within 45 minutes of the juice being squeezed from the tomato.

8. The method of claim 1, wherein the fresh tomato juice is free of additives.

9. The method of claim 1, wherein the fresh tomato juice is not diluted with other liquids before being added to the suspension.

10. The method of claim 1, wherein the weight ratio of the amount of fresh tomato juice added to the amount of the suspension is about 2:1 to about 1:2.

11. The method of claim 1, wherein the time period is not less than 22 hours, and not more than 30 hours.

12. The method of claim 1, wherein the graphene oxide, the graphite oxide, or the combination thereof comprise about 0.1 wt % to about 15 wt % of the suspension.

13. The method of claim 1, wherein the graphene oxide, the graphite oxide, or the combination thereof comprise about 0.2 wt % to about 5 wt % of the suspension.

14. A method comprising:
    forming a suspension comprising a solvent and a product of oxidation of graphite, the product of oxidation of graphite comprising graphene oxide, graphite oxide, or a combination thereof;
        wherein the graphene oxide, the graphite oxide, or the combination thereof, and the solvent comprise at least 95 wt % of the suspension;
    adding fresh tomato juice to the suspension;
    exfoliating the product of oxidation of graphite, exfoliating graphite during formation of the product of oxidation of graphite, or a combination thereof;
    after exfoliation, allowing the suspension with added fresh tomato juice to sit quiescently for a time period at a temperature in the range of about 18° C. to about 25° C. to form a solid product, the solid product comprising the exfoliated graphene oxide, exfoliated graphite oxide, or both, that have been at least partially reduced to graphene;
    after the time period, separating the solid product comprising graphene from the suspension with added fresh tomato juice.

15. The method of claim 14, wherein the exfoliation comprises ultrasonication.

16. The method of claim 15, wherein the suspension with added fresh tomato juice is subjected to ultrasonication.

17. The method of claim 15, wherein ultrasonication is executed for at least 45 minutes.

18. The method of claim 14, wherein the solvent comprises water.

19. The method of claim 18, wherein 99 wt % of the suspension consists of water and the product of oxidation of graphite.

20. The method of claim 14, wherein the graphene oxide, the graphite oxide, or the combination thereof comprises about 0.1 wt % to about 3.0 wt % of the suspension.

21. The method of claim 14, wherein the fresh tomato juice is added to the suspension within 45 minutes of the juice being squeezed from the tomato.

22. The method of claim 14, wherein the fresh tomato juice is free of additives, and the fresh tomato juice is not diluted with other liquids before being added to the suspension.

23. The method of claim 14, wherein the weight ratio of the amount of fresh tomato juice added to the amount of the suspension is about 2:1 to about 1:2.

24. The method of claim 14, wherein the time period is not less than 22 hours, and not more than 30 hours.

25. A method comprising:
   forming a suspension comprising a solvent and graphite oxide, and the suspension optionally comprising graphene oxide;
      wherein about 0.01 wt % to about 25 wt % of the suspension is graphite oxide, or if graphene oxide is present, about 0.01 wt % to about 25 wt % of the suspension is graphite oxide and graphene oxide;
   adding fresh tomato juice to the suspension;
   exfoliating the graphite oxide, and optionally, the graphene oxide, if present;
   after exfoliation, allowing the suspension with added fresh tomato juice to sit quiescently for a time period at a temperature in the range of about 18° C. to about 25° C. to allow for the formation of a solid product, the solid product comprising graphene, at least a portion of the graphene resulting from at least partial reduction of the exfoliated graphite oxide, and, if present, the exfoliated graphene oxide;
   after the time period, separating the solid product comprising graphene from the suspension with added fresh tomato juice.

26. The method of claim 25, wherein the suspension with added fresh tomato juice is subjected to ultrasonication and the ultrasonication is executed for at least 5 minutes and not more than 6 hours.

27. The method of claim 25, wherein the solvent comprises water, and at least 99 wt % of the suspension consists of water and graphite oxide, or, if graphene oxide is present, at least 99 wt % of the suspension consists of water and graphite oxide and graphene oxide.

28. The method of claim 25, wherein about 0.1 wt % to about 15 wt % of the suspension comprises graphite oxide, or if graphene oxide is present, about 0.1 wt % to about 15 wt % of the suspension comprises a combination of graphite oxide and graphene oxide.

29. The method of claim 25, wherein the fresh tomato juice is added to the suspension within 45 minutes of the juice being squeezed from the tomato.

30. The method of claim 25, wherein the fresh tomato juice is free of additives, and the fresh tomato juice is not diluted with other liquids before being added to the suspension.

31. The method of claim 25, wherein the weight ratio of the amount of fresh tomato juice added to the amount of the suspension is about 2:1 to about 1:2.

32. The method of claim 25, wherein the time period is not less than 22 hours, and not more than 30 hours.

33. A method comprising:
   forming a suspension comprising a solvent and graphite oxide, and the suspension optionally comprising graphene oxide;
   adding fresh tomato juice to the suspension;
   sonicating the suspension before, after, and/or during the addition of fresh tomato juice;
   after sonication, allowing the suspension with added fresh tomato juice to sit quiescently for a time period at a temperature in the range of about 18° C. to about 25° C. to allow for the formation of a solid product, the solid product comprising graphene, at least a portion of the graphene resulting from at least partial reduction of the exfoliated graphite oxide, and, if present, the exfoliated graphene oxide;
   after the time period, separating the solid product comprising graphene from the suspension with added fresh tomato juice.

34. The method of claim 33, wherein the solvent comprises water, and at least 99 wt % of the suspension consists of water and graphite oxide, or, if graphene oxide is present, at least 99 wt % of the suspension consists of water and graphite oxide and graphene oxide.

35. The method of claim 33, wherein about 0.2 wt % to about 5.0 wt % of the suspension comprises graphite oxide, or if graphene oxide is present, about 0.2 wt % to about 5.0 wt % of the suspension comprises a combination of graphite oxide and graphene oxide.

36. The method of claim 33, wherein the weight ratio of the amount of fresh tomato juice added to the amount of the suspension is about 2:1 to about 1:2.

37. The method of claim 33, wherein the time period is not less than 22 hours, and not more than 30 hours.

\* \* \* \* \*